United States Patent [19]

Smith

[11] Patent Number: 4,512,586
[45] Date of Patent: Apr. 23, 1985

[54] SEAL WITH PREFORMED V-SHAPED PACKING RINGS AND METHOD

[76] Inventor: Russell G. Smith, Maison LaFayette, 800 Rue de LaPaix, #26, Cincinnati, Ohio 45220

[21] Appl. No.: 611,993

[22] Filed: May 18, 1984

[51] Int. Cl.³ .................... F16J 15/18; B29C 17/04
[52] U.S. Cl. ........................................ 277/124; 277/1; 277/9.5; 277/105; 264/295; 264/297.4; 264/297.5; 264/320
[58] Field of Search .................. 277/1, 9, 9.5, 10, 11, 277/105, 106, 123–125, 152, 153, DIG. 6; 264/127, 138, 295, 297.4, 297.5, 320, 322

[56] References Cited

U.S. PATENT DOCUMENTS

| | | | |
|---|---|---|---|
| 1,956,843 | 5/1934 | Wheeler | 277/11 |
| 2,132,814 | 10/1938 | Wheeler | 277/105 |
| 3,032,825 | 5/1962 | Proud | 264/159 |
| 3,069,178 | 12/1962 | Rosen | 277/124 X |
| 3,549,445 | 12/1970 | McMahon | 264/322 X |
| 4,171,561 | 10/1979 | Bainard et al. | 277/153 X |
| 4,335,889 | 6/1982 | Cather et al. | 277/152 |

FOREIGN PATENT DOCUMENTS

| | | | |
|---|---|---|---|
| 1101723 | 4/1955 | France | 277/11 |
| 46-23681 | 7/1971 | Japan | 277/153 |

OTHER PUBLICATIONS

John Crane V-Ring Packings, Bulletin No. P-420-2, 12 pp., no date.

Primary Examiner—Robert S. Ward
Attorney, Agent, or Firm—James D. Liles

[57] ABSTRACT

A packing arrangement for sealing an area about a shaft in a structural body includes a plurality of V-shaped packing rings in stacked alignment. The packing rings are made from a memory retainable material and preformed into the V-shaped configuration with a forming die. After being preformed, the V-shaped packing rings are compressed beyond their preformed configuration and placed in a packing chamber. The memory characteristics of the packing ring material are such that the rings are urged toward their preformed V-shape to compensate for any dimensional instability of the rings during thermal cycling. The packing rings also have a very small stack height and provide an increased number of sealing surfaces within a predetermined sealing area.

16 Claims, 11 Drawing Figures

SEAL WITH PREFORMED V-SHAPED PACKING RINGS AND METHOD

TECHNICAL FIELD

The invention relates generally to fluid sealing and more particularly concerns a packing arrangement for sealing a rotating or reciprocating shaft. The invention will be specifically disclosed in connection with a plurality of preformed V-shaped packing rings of memory retainable material which retain their sealing relationship with a shaft after thermal cycling of the rings from elevational temperatures in the 400–500 degrees Fahrenheit range to subzero temperatures (below 0 degrees Fahrenheit).

BACKGROUND OF THE INVENTION

It is common contemporary practice to seal reciprocating or rotational shafts with a packing arrangement formed by a plurality of stacked V-shaped rings. The V-shaped rings are generally disposed in the packing chamber of a structural body in circumferentially sealing relationship to the shaft. Follower rings (also known as adaptor assemblies) are also typically employed with the follower rings and positioned on opposite axial sides of the V-shaped rings. The externally positioned follower ring is urged into axially compressive engagement with the stacked V-rings by a packing flange, with the internally positioned follower ring restrained from axial movement toward the interior of the system by the bottom of the packing chamber. Axial compression of the V-shaped ring stack tends to radially expand the rings and to assist in maintaining a sealing relationship between the V-rings and the shaft. A packing spring is also occasionally employed on the exterior side of the internally positioned follower ring to compressingly urge the internally positioned follower ring into preloaded engagement with the V-shaped ring.

Such V-rings have been formed from a wide variety of materials in the past. For example, elastomeric V-rings formed from homogenous rubbers have been used in many applications where relatively low pressures are encountered and where the fluid medial involved does not damage the rubber. Fabric V-rings coated with elastomers are often used on heavy duty equipment or when higher pressures are encountered. However, when a corrosive media is handled, the corrosive media will often attack both the rubber and the fabric rings, making them unsuitable for commercial use. Hence, under such conditions, V-shaped rings of a molded fluoronated hydrocarbon polymer, such as polytetrafluoroethylene are used. Polytetrafluoroethylene (sold under the trademark TEFLON) is inert to virtually all chemical media and is suitable for use with a very wide range of corrosive fluids. Furthermore, fluoronated hydrocarbon polymeric V-rings operate successfully through a wide range of temperatures, from approximately minus 120 degrees Fahrenheit to plus 500 degrees Fahrenheit. In addition, many of the fluoronated hydrocarbon polymers have an extremely low coefficient of friction.

Unfortunately, these fluoronated hydrocarbon polymers have a high coefficient of expansion relative to most metals. Further, when cooled after exposure to elevated temperatures, fluoronated hydrocarbon polymers may shrink to a size which is smaller than their original size. Thus, even when prior polytetrafluoroethylene packing rings are initially compressed tightly in sealing relationship about a metal shaft in a metal structural body, the sealing relationship may be lost if the system is thermally cycled.

Moreover, prior art polytetrafluoroethylene seals have been formed to the desired V-shaped configuration by compressive molding techniques. Such a process, while highly satisfactory in providing a V-shaped configuration, is not without its disadvantages. First of all, the ring must usually have a minimum thickness of approximately ⅛ inch to facilitate proper molding. As a result, when the rings are stacked in a packing arrangement, the compressive molding requirements limit the minimum stack height requirements and thus limit the number independent sealing surfaces acting on the shaft and chamber sidewalls. Additionally, compressively molded rings are permanently shaped and lack any tendency to expand out of their molded V-shape.

SUMMARY OF THE INVENTION

Accordingly, it is a primary object of the present invention to provide a packing ring arrangement for improved sealing with a shaft.

It is another object of the invention to provide a series of fluoronated hydrocarbon polymeric packing rings which maintain a sealing relationship with a shaft in a system subject to thermal cycling.

Another object of the invention is to provide a packing ring arrangement with an increased number of independent sealing surfaces.

Yet another object of the invention is to provide a packing ring arrangement for a pressurized fluid system with an increased number of multiple pressure drops between the interior and exterior of the system.

A still further object of the invention is to provide a packing assembly of a plurality of memory retainable packing rings which elastically compensate for any thermal shrinkage of the rings.

It is yet another object to provide a packing arrangement for a rotary or reciprocating shaft which compensates for misalignment or eccentric movement of the shaft relative to a structural body.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the invention described herein, an improved packing arrangement for sealing a pressurized fluid system is provided. The packing arrangement seals the area about a shaft extending into the structural body. A plurality of packing rings formed from a memory retainable material are stacked in alignment with each other in a packing chamber of the structural body. The rings are preformed in a forming die from a substantially planar body circumferentially disposed about a centrally disposed shaft receiving aperture into a preformed V-shaped configuration. In this preformed configuration, each packing ring includes a pair of obliquely oriented sidewalls convergingly disposed in concentric relationship to each other. The packing chamber has cylindrical sidewalls in spaced concentric relationship to the shaft, and the stacked packing rings are disposed in aligned relationship in the chamber between the cylindrical sidewalls and the shaft. In this position, the obliquely oriented packing ring sidewalls are compressed toward each other beyond the preformed V-shaped configuration. The memory retainable material is operative to urge the rings toward their preformed configuration whereby the sealing relationship between the cylindrical sidewalls and the shaft is enhanced.

In accordance with a further aspect of the invention, the V-shaped packing rings have a thickness between 0.015 inch and 0.079 inch.

According to a further aspect of the invention, the packing rings have a coefficient of thermal expansion which is greater than the coefficient of thermal expansion of the shaft and the structural body.

In another aspect of the invention, means are provided for applying an axially compressive force to the plurality of packing rings while the rings are in the packing chamber.

In one specific aspect of the invention, the packing rings are formed of a fluoronated hydrocarbon polymer.

In a more specific and preferred form of the invention, the packing rings are formed of polytetrafluoroethylene.

In another aspect of the invention, the V-shaped rings converge toward an apex pointing toward the exterior of a structural body.

In one alternative form of the invention, a first portion of the plurality of packing rings converge toward an apex pointing toward the exterior of a structural body and a second portion of the plurality of packing rings converge toward an apex pointing away from the exterior of the structural body.

In yet another aspect of the invention, each packing ring is formed from a relatively thin memory retainable material into a preformed V-shaped configuration, and the memory characteristics of the material are operative to resiliently urge the ring against both the shaft and the sidewalls of the packing chamber.

In accordance with another aspect of the invention, a method of sealing a shaft is provided. The method includes forming a first substantially planar ring of memory retainable material with a forming die into a preformed V-shaped configuration having a pair of obliquely oriented converging sidewalls in concentric relationship to each other. The V-shaped ring is then positioned into a packing chamber of a structural body to interpose the ring between a shaft and sidewalls of the structural body such that the shaft and structural body sidewalls compressingly engage the periphery of the ring and urge the converging sidewalls toward each other beyond the preformed configuration of the ring. At least one additional ring is formed of memory retainable material into the preformed V-shaped configuration with a forming die and the at least one additional V-shaped ring is positioned into the packing chamber into aligned stacked relationship with the first V-shaped ring to form a packing assembly to seal between the shaft and the structural body.

In another aspect of the method of the invention, the steps of positioning the first and at least one additional V-shaped rings into the annular packing chamber include stacking the rings in a loading cartridge and transferring the rings from the loading cartridge into the packing chamber.

In another aspect of the invention, the concentric sidewalls of the rings are compressingly urged toward each other beyond the preformed V-shaped configuration of the rings in the loading cartridge and the concentric sidewalls are retained compressed beyond the preformed V-shaped configuration during transfer from the loading cartridge to the packing chamber.

In a still further aspect of the invention, the loading cartridge has axially extending lips, and the axially extending lips are partially inserted into the packing chamber during transfer of the rings from the loading cartridge to the packing chamber.

Yet another aspect of the invention includes forming the V-shaped packing rings from planar packing rings having a thickness between 0.015 inch and 0.079 inches.

In one specific aspect of a preferred form of the invention, the packing rings have a thickness of approximately 0.030 inch.

Still other objects of the present invention will become readily apparent to those skilled in this art from the following description wherein there is shown and described a preferred embodiment of this invention, simply by way of illustration of one of the best modes contemplated for carrying out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompany drawings.

DETAILED DESCRIPTION OF THE PREFERRED EMBODIMENT

Figure 1:
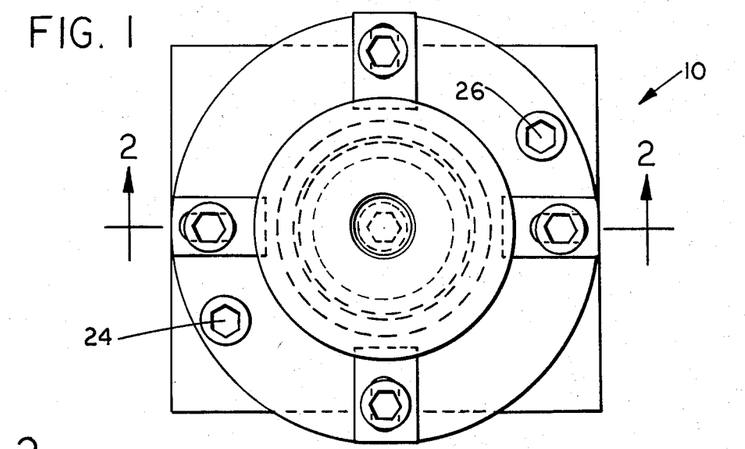
FIG. 1 is a top plan view of a forming die used to preform substantially planar packing rings into a V-shaped configuration in accordance with the principles of the present invention.
Figure 2:
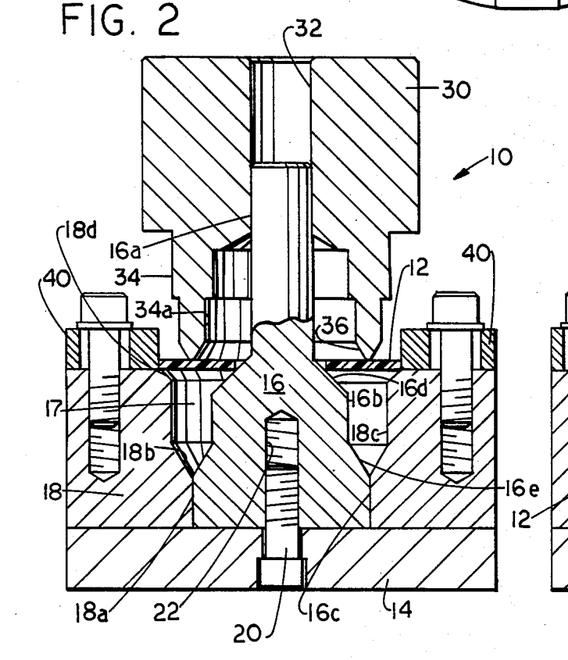
FIG. 2 is a cross-sectional elevational view of the forming die of FIG. 1 taken along line 2—2 of FIG. 1 showing a plunger type forming element of the die coming into engagement with a planar packing ring.
Figure 3:
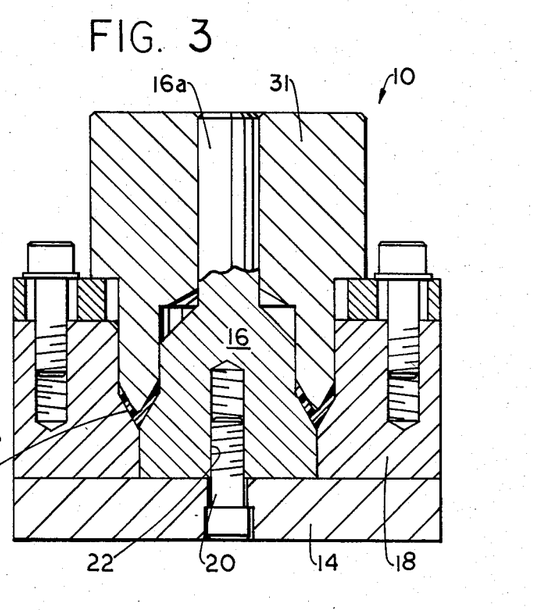
FIG. 3 is a cross sectional elevational view similar to FIG. 2 but showing a second plunger type forming element forming the packing ring formed into a V-shaped configuration.

Referring now to the drawings FIGS. 1–3 depict a forming die, generally designated by the numeral 10, for preforming packing rings 12 (FIGS. 2 and 3 only) made from a memory retainable material into a V-shaped configuration in accordance with the principles of the present invention. As best seen in FIGS. 2 and 3, the illustrated forming die 10 has a lower section including a base 14, a core 16 and an outer portion 18. A bolt 20 extends through the base 14 and is threadably received by a bore 22 in the core 16 to firmly, but releasably, secure the core 16 and base 14 together.

As illustrated in FIG. 1, a pair of bolts 24,26 extend through the outer portion 18 and are received by similarly spaced threaded bores (not shown) in the base 14 for firmly securing the outer portion 18 and the base 14 in adjacent relationship (as seen in FIGS. 2 and 3). The core 16, as seen in FIGS. 2 and 3, has a three stage cylindrical configuration including an upper cylindrical section 16a, an intermediate cylindrical section 16b, and a lower cylindrical section 16c. The lower cylindrical section 16c has a diametral dimension greater than the corresponding diametral dimension of the intermediate section 16b. In turn, the diametral dimension of the intermediate section 16b is greater than the corresponding diametral dimension of the upper cylindrical section 16a. The upper and intermediate cylindrical sections 16a, 16b are joined by a first frustum having obliquely oriented sidewalls 16d. A second frustum having obliquely oriented sidewalls 16e joins the intermediate and lower cylindrical sections 16b,16c.

The outer portion 18 is concentrically disposed about the core 16 and includes a lower interior cylindrical sidewall 18a in an abutting relationship to the lower cylindrical section 16c of core 16. The lower cylindrical sidewall 18a is joined to a larger interior cylindrical sidewall 18c of the outer portion 18 by an obliquely oriented sidewall 18b. The oblique sidewall 18b is a virtual mirror image of the second frustum sidewall 16e and cooperates with the sidewall of cylindrical section 16c to radially space the cylindrical sidewalls 16b and 18c, the cylindrical sidewall 18c being in spaced parallel relationship to the sidewall 16b. The interior cylindrical surface 18c is joined to the top of the outer portion 18 by an obliquely extending lead-in champher 18d. The core sidewalls 16b,16e and the sidewalls 18b,18c of outer portion 18 cooperate to define an annular V-shaped chamber 17. The oblique sidewalls 16d and 18d provide a gradually tapered lead-in to the chamber 17.

The upper section of the forming die 10 includes a forming element, such as elements 30 and 31 illustrated in FIGS. 2 and 3 respectively, having a centrally disposed bore 32. The bore 32 slidingly receives the upper cylindrical section 16a of the core 16. The forming element 30 (FIG. 2) also includes a downwardly extending skirt 34 which is concentrically disposed about the upper cylindrical section 16a when the cylindrical section 16a is inserted into bore 32. The lower end of skirt 34 in FIG. 2 includes a section 34a which is reduced in radial dimension to avoid "pinching" of the ring 12 against the lead-in champher 18d. The section 34a terminates in a pointed V-shaped tip 36. The lower section of forming die 10 also includes a plurality of spaced alignment stops 40 secured to the top of outer section 18. These stops 40 are operative to align the outer diameter of the ring 12 and to bring the ring 12 into concentric relationship with the forming die 10 about the core 16.

Figure 4:
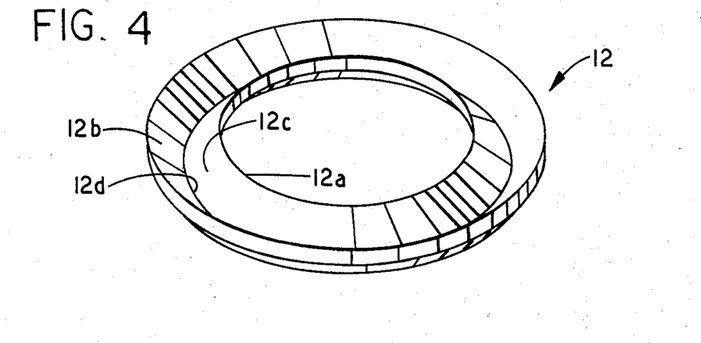
FIG. 4 is a perspective view of the packing ring formed in FIG. 3 depicting the preformed configuration of the ring after as it has undergone the steps depicted in FIGS. 2 and 3.

As most readily realized from a comparison of FIGS. 2, 3 and 4, the forming die 10 is used to preform the packing rings 12, which, as indicated above, are formed from a memory retainable material into a preformed V-shaped configuration. A washer ring 12 having a centrally disposed aperture 12a is positioned about the core section 16d on the lower section of the forming die 10. The washer ring 12 is substantially planar and circumferentially disposed about the central aperture 12a. The dimensions of the ring 12 and die 10 are such that the interior edges of the ring 12 are supported by the obliquely extending sidewall 16d while the exterior edges are supported by the champher 18d of the core 16, so long as the ring 12 retains its substantially planar form.

The downward movement of the first forming element 30 with respect to the lower section of die 10 directs the V-shaped tips 36 of the skirt 34 into engagement with the ring 12. As this downward movement of forming element 30 continues, the ring 12 begins to deflect and the ring begins to assume a V-shaped configuration.

Once the shaping of ring 12 begins, forming element 30 (FIG. 2) is replaced with the second forming element 31 (FIG. 3). Forming element 31 is virtually identical to forming element 30 except that the lower end of skirt 34 is not reduced in radial dimension. Instead, the profile of skirt 34 on forming element 31 matches the profile of annular chamber 17. Forming element 31 is then moved downwardly on core 16 to further deflect the ring 12 into the pronounced V-shaped configuration of FIG. 3.

When the ring 12 is removed from the forming die 10 after completion of the steps depicted in FIGS. 2 and 3, it only partially recoils toward its original planar shape. The result is a preformed ring having a configuration such as illustrated in FIG. 4. As shown in FIG. 4, the preformed V-shaped ring 12 produced by forming die 10 has a pair of obliquely oriented sidewalls 12b,12c which convergingly extend to an apex 12d. The sidewalls 12b,12c are disposed in concentric relationship to each other.

Figure 5:
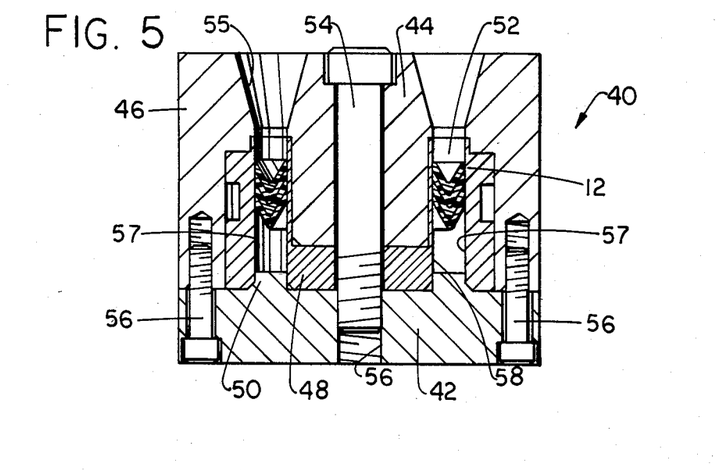
FIG. 5 is a cross sectional view of a loading assembly for loading a plurality of the preformed packing rings into stacked relationship.

In accordance with the principles of the invention, the preformed V-shaped rings depicted in FIG. 4 are inserted into a loading assembly 40, as shown in the illustration of FIG. 5. The illustrated loading assembly 40 includes a base 42, an interior retainer 44, an exterior retainer 46, and a two part loading cartridge 48. An annular ridge 50 extends upwardly from the base 42 and is received by an annular cavity 52 between inner and outer components the loading assembly 48 (described hereafter in detail). A bolt 54 extends through both the interior retainer 44 and the inner component of the loading cartridge 48 and is received by a threaded bore 56 in the base 42 for firmly, but releasably, securing the interposed loading cartridge 48 to the base 42.

The exterior retainer 46 fits around the loading cartridge 48 and is secured to the base 42 by a plurality of spaced screws 56 extending through the base 42 into the exterior retainer 46. The upper exterior sidewall of the interior retainer and the upper exterior sidewall of the exterior retainer cooperate to form a gradually tapered lead-in opening 55 from the top of loading assembly 40 into the annular loading cartridge cavity 52.

The preformed rings 12 from the forming die 10 are forceably inserted through the tapered opening 55 with the apex 12d downward. The sidewalls of the tapered opening 55 gradually compress and deflect the ring sidewalls 12b and 12c toward each other as the ring 12 is moved into the loading cartridge cavity 52. Sidewalls 57 and 58 of the loading cartridge 48 further force the obliquely oriented sidewalls 12b and 12c of the preformed packing ring 12 toward each other and beyond the preformed configuration (shown in FIG. 4) of the ring 12 until the rings 12 assume the more pronounced V-shaped configuration of FIG. 5. A plurality of rings 12 are successively inserted into the loading cartridge cavity 52 in this same manner to form a vertical aligned packing ring assembly as depicted in FIG. 5.

Once the vertically aligned stacking of packing rings 12 in cavity 52 is completed, the loading assembly 40 is disassembled and the loading cartridge 48 removed. The loading cartridge 48 is shown in FIG. 6 as it is removed from the loading assembly 40 and loaded with a plurality of vertically stacked rings 12.

Figures 6, 7:
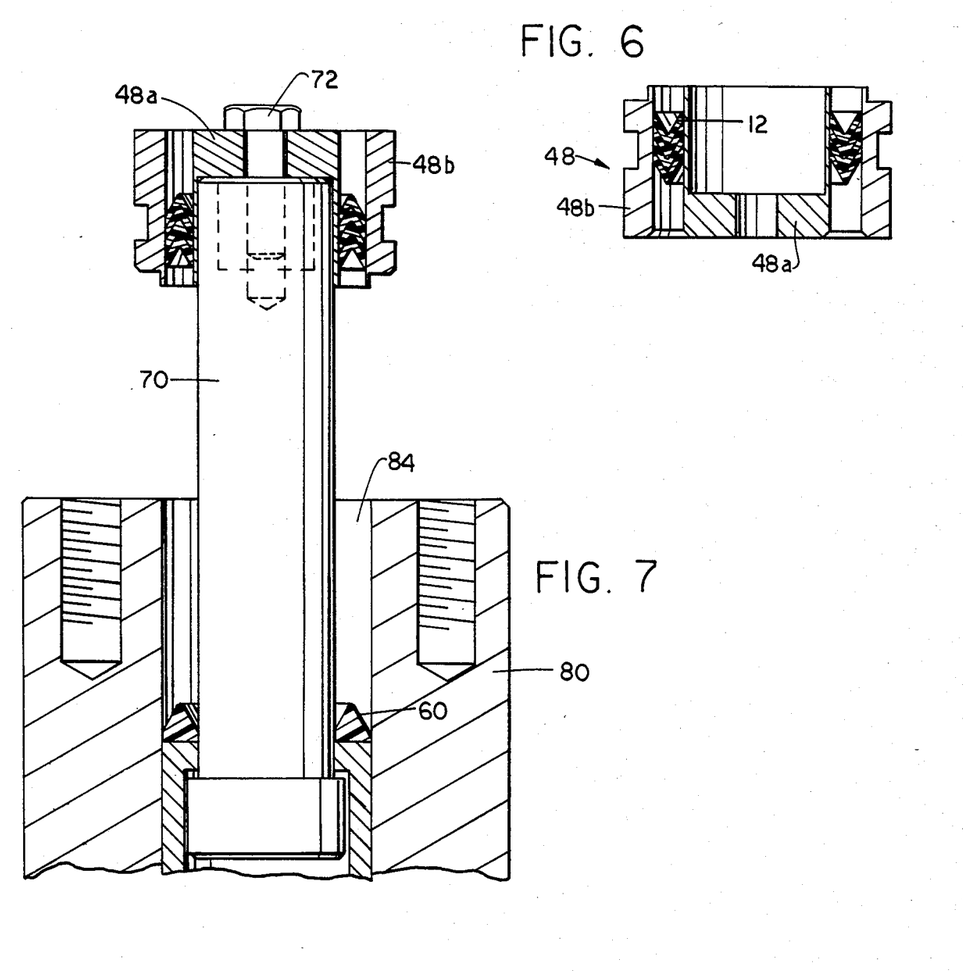
FIG. 6 is a cross sectional view of a loading cartridge contained in the loading assembly of FIG. 5 as it is removed from the loading assembly after being loaded with a plurality of packing rings.
FIG. 7 is a cross sectional view of the loading cartridge of FIG. 6 mounted atop a shaft extending out of a structural body.
Figure 8:
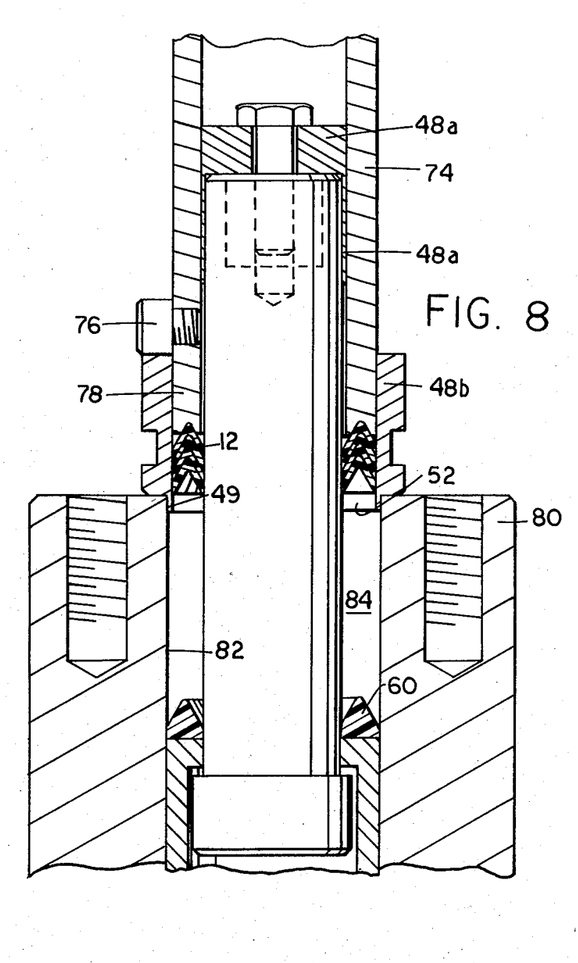
FIG. 8 is a cross sectional view similar to FIG. 7, but showing the packing rings and outer sleeve portion of the loading cartridge separated from the cup-like base portion and moved axially downward along the shaft by a tubular loading member.

Turning now to FIG. 7, after positioning a follower ring 60 into a packing chamber 84 of a structural body 80, the loading cartridge 48 is inverted from the illustrated positions of FIGS. 5 and 6 and secured to the top of a shaft 70 by a bolt 72. By comparing FIGS. 7 and 8, it will be readily appreciated, as suggested above, that the loading cartridge 48 consists of two separable components, a cylindrical cup-like base 48a and a circumferentially extending sleeve 48b. A tubular loading member 74 is selectively engageable with the loading cartridge 48 for separating the two cartridge components 48a and 48b. The tubular loading member has an internal diameter aproximately equal the outer diameter of the cup-like base 48a and a radial thickness approximately equal to the radial dimension of the cartridge cavity 52. A stop member 76, illustrated in FIG. 8 is spaced from but positioned proximal to, a first end 78 of the tubular loading member 74. When concentrically positioned with respect to the shaft 70, and driven downwardly (as illustrated) into the loading cartridge 48, the first loading member end 78 is moved into the annular cavity 52 against the stack of packing rings 12. The stop member 76 is spaced from the first loading member end 78 so as to engage the sleeve 48b approximately simultaneously with the engagement of the first loading member end 78 and the stack of packing rings 12. Continued downward travel of the tubular loading member 74 forces separation of the loading cartridge components 48a, 48b and axially slides both the sleeve 48b and the packing rings 12 down the shaft 70.

Figure 9:
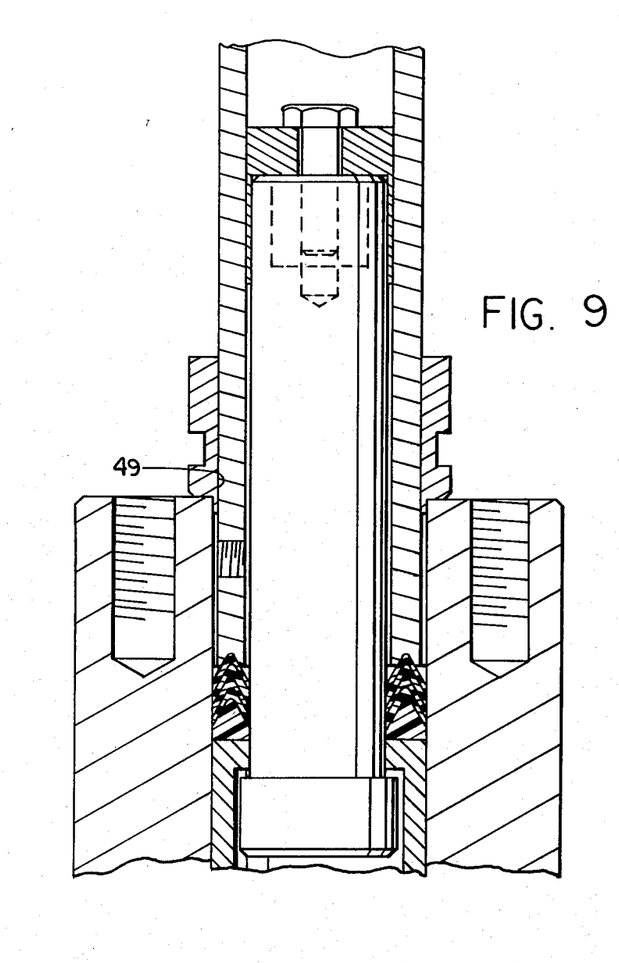
FIG. 9 is a cross sectional view similar to FIG. 8, but showing the packing rings separated from the outer sleeve portion of the loading cartridge and moved further axially along the shaft into a packing chamber of the structural body.

In the illustration of FIG. 8, the structural body 80 (of a valve or other structural element) housing the shaft 70 limits the downward movement of the sleeve 48b. Axially extending lips 49 from the sleeve 48b are directed into the packing chamber 84 to guide and precisely position the sleeve 48b with respect to the structural body 80 during the last portion of this axial movement. With the stop member 76 radially extending from the tubular loading member 74, downward movement of the tubular loading member 74 is similarly limited by the position of the sleeve 48b. However, once the stop member 76 is removed, continued movement of the tubular loading member 74 is possible. Such continued movement is depicted in FIG. 9 wherein the tubular loading member 74 has completely removed the vertical stack of packing rings 12 from the loading cartridge 48 and positioned the rings 12 in the packing chamber 84, the packing chamber 84 being circumferentially disposed about the shaft 70 and partially defined by the walls 82 of structural member 80.

Figure 10:
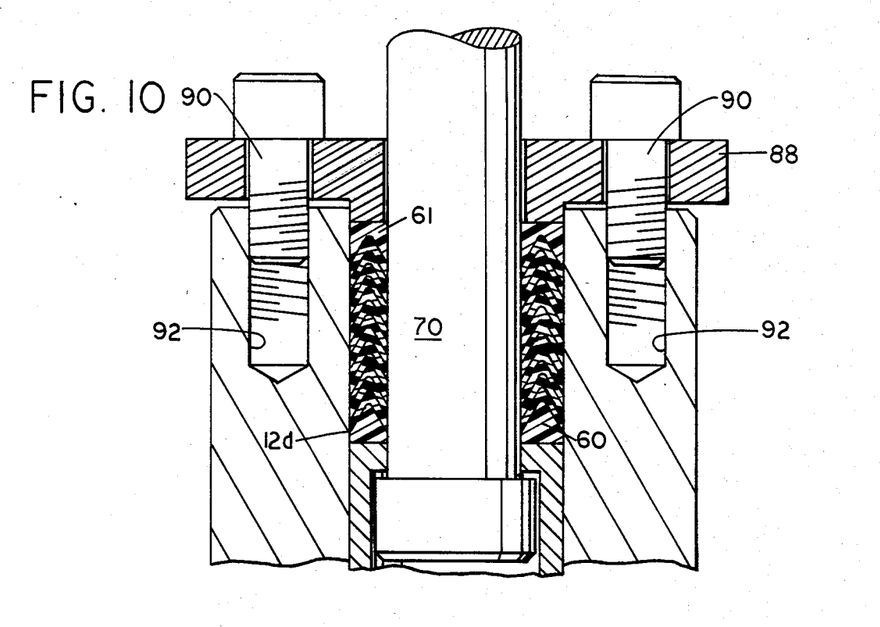
FIG. 10 is a fragmentary cross sectional view of the valve of FIG. 9 with the loading cartridge completely removed and the packing rings contained within the packing chamber by a gland secured to the structural body.

Once the tubular loading member 74 and loading cartridge 48 are removed, the loading process may be repeated, if necessary, until the packing chamber 84 is filled with vertically stacked V-rings 12. A follower ring assembly 61 is positioned at the top axial end of the V-rings 12. A gland 88 (shown in FIG. 10) is then firmly secured to the structural body 80 and compressingly urged against the follower ring 53. In FIG. 10, the gland 88 is secured to the body by a plurality of spaced screws 90 received by similarly spaced bores 92 in the structured body 80.

Quite significantly, the V-shaped packing rings 12 in the packing chamber 84 have an elastic memory which urges the rings back toward the less pronounced preformed or free state V-shaped configuration of FIG. 4. Thus, when the structural body 80, shaft 70 and packing rings 12 are subjected to elevated temperatures, the rings 12 will expand at a greater rate than the body 80 or shaft 70, as in prior art packing arrangements. However, when the packing arrangement of the invention is cooled and the rings 12 are shrunk beyond their original size, the elastic memory of the rings 12, unlike the prior art packing arrangements, further expands the V-shaped rings 12 toward the FIG. 4 configuration by urging the ring sidewalls 12b, 12c away from each other to maintain and enhance the sealing relationship between the shaft 70 and structural body 80.

The packing rings 12 of the invention must be formed from a memory retainable material to perform the elastic memory expansion discussed above. One group of materials suitable for this purpose are the fluoronated hydrocarbon polymers. In the preferred embodiment of the invention, the packing rings 12 may be formed of polytetrafluoroethylene.

V-shaped packing ring arrangements formed in the above described manner may also be advantageously formed of relatively thin stock material. The use of such relatively thin rings reduces the ring stack height and permits an increased number of independent sealing surfaces within a predetermined sealing area. This results in a corresponding increase in the number of separate pressure drops across the sealing area and provides increased sealing efficiency. Preferably, the rings 12 are formed of planar stock rings having a thickness between 1/64 and 5/64 of an inch. In the preferred emmbodiment, the rings 12 have a thickness of approximately 0.030 inch.

In the embodiment of FIG. 10, all of the packing rings 12 have the same orientation, the apex 12d of the V-shaped rings being positioned away from the interior of the structural body 80. Such an arrangement is most advantageous for applications where the fluid pressure inside the structural body 80 exceeds the ambient pressure. It will be appreciated, however, that the packing rings 12 are advantageously inverted with the apex 12d pointing toward the interior of structural body 80 for vacuum applications (when the internal pressure is less than atmospheric pressure). As used in the present specification and claims, the terms "pressure" and "pressurized" will refer to both positive pressure wherein the pressure exceeds atmospheric pressure and negative pressure (or vacuum) wherein the pressure is less than atmospheric pressure.

Figure 11:
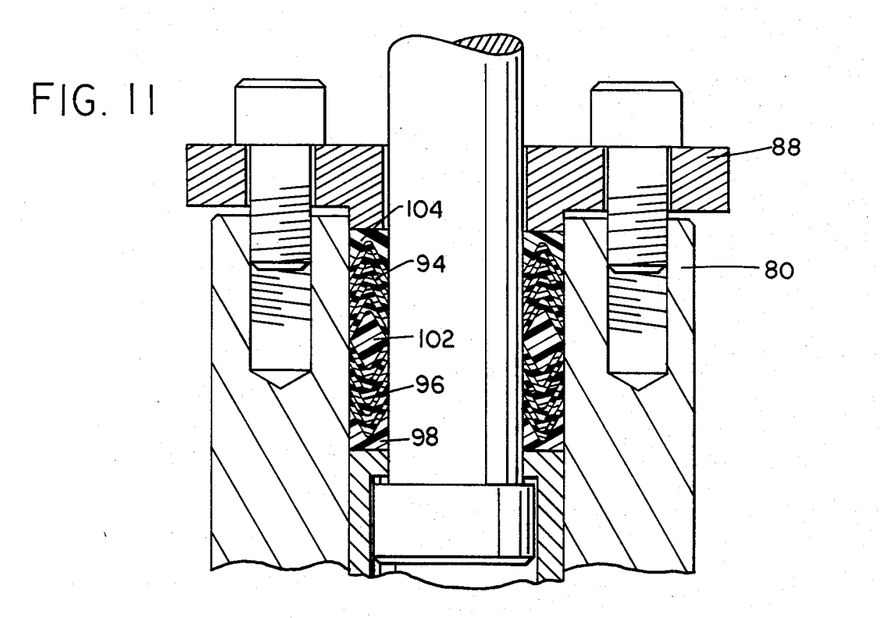
FIG. 11 is a cross sectional view similar to FIG. 10, but depicting a different arrangement of packing rings for combined pressure and vacuum service.

In FIG. 11, a further embodiment of the invention is illustrated wherein a first portion 94 of the stack of V-shaped packing rings 12 are positioned with the apex 12d pointing away from the body 80 interior with apex 12d of a second portion 96 of the V-shaped packing ring stack pointing toward the body interior. In the illustrated embodiment of FIG. 11, three follower rings are used: first and second female followers 98 and 100 positioned respectively at the bottom and top of the stack of rings 10; and an intermediately disposed diamond shaped follower 102. Alternatively, the intermediate diamond shaped follower 102 may be replaced with two male followers (such as follower 60 in FIG. 10) placed in back to back relationship. The embodiment of FIG. 11 is designed for combined positive-negative pressure (above or below atmospheric pressure) applications. The first portion 94 of the packing ring stack is particularly effective in sealing when internal pressure exceeds the external pressure. The second portion 96 of the packing assembly, on the other hand, is particularly advantageous in sealing during vacuum applications (below atmospheric pressure).

The arrangement of the V-shaped packing rings in FIG. 11 may be advantageously employed with the elimination of the diamond shaped follower ring 102 (or back to back male following rings) with a positively pressurized fluid media being applied at this intermediate location of the packing assembly. The application of a pressurized inert fluid media with a pressure in excess of the process fluid internal to structural body 80 at the intermediate location of the follower ring 102 would insure that any leakage be from the outside to the inside and not vice versa.

In summary, numerous benefits have been described which result from employing the concepts of the invention. The sealing relationship between a shaft and a surrounding structural body no longer depends solely upon an externally applied compression force applied to a packing ring arrangement. Instead, the sealing relationship is enhanced by the memory of a preformed V-shaped ring. The packing ring arrangement of the invention is particularly advantageous when the packing ring arrangement and surrounding components are under thermal cycling. Although the packing rings of the invention will shrink beyond their original size during subsequent cooling after heating to an elevated temperature, the stored memory of the rings expands and separates the sidewalls of the V-shaped ring to compensate for such shrinking and to maintain a sealing relationship.

The invention also permits an increased number of packing rings of decreased thickness and stack height. Consequently, an increased number of independent seals is possible within a predetermined sealing area. An increased number of independent sealing surfaces also results in a corresponding multiple of independent pressure drops and improves sealing efficiency. Increasing the number of independent sealing surfaces is particularly advantageous for misalignment of the shaft, which occurs in virtually all reciprocating or rotary shaft applications.

The foregoing description of a preferred embodiment of the invention has been presented for purposes of illustration and description. It is not intended to be exhaustive or to limit the invention to the precise form disclosed. The illustrated embodiment, in fact, was designed for developing prototypes in accordance with the present invention. Obvious modifications or variations are possible in light of the above teachings. For example, step and sequential dies would preferably be used in the production manufacture of packing arrangements according to the invention. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A packing arrangement for sealing a pressurized fluid system, comprising:
   (a) a structural body;
   (b) a shaft extending into said structural body;
   (c) a plurality of packing rings formed from a memory retainable material, said packing rings being stacked in alignment with each other, said rings being preformed in a forming die from a substantially planar body circumferentially disposed about a centrally disposed shaft receiving aperture into a preformed V-shaped configuration with a pair of obliquely oriented sidewalls convergingly disposed in concentric relationship to each other; and
   (d) a packing chamber in said body, said packing chamber having cylindrical sidewalls in spaced concentric relationship to said shaft, said stacked packing rings being disposed in aligned compressive relationship in said chamber between said cylindrical sidewalls and said shaft, wherein the obliquely oriented packing ring sidewalls are compressed toward each other beyond the preformed V-shaped configuration, said memory retainable material being operative to urge the rings toward their preformed configuration whereby the sealing relationship between the cylindrical sidewalls and the shaft is enhanced.

2. A packing arrangement as recited in claim 1 wherein the V-shaped packing rings have a thickness between 0.015 inch and 0.079 inch.

3. A packing arrangement as recited in claim 2 wherein the packing rings have a coefficient of thermal expansion which is greater than the coefficient of thermal expansion of the shaft and the structural body.

4. A packing arrangement as recited in claim 2 further including means for applying an axially compressive force to the plurality of packing rings in the packing gland.

5. A packing arrangement as recited in claim 4 wherein the packing rings are formed of a fluoronated hydrocarbon polymer.

6. A packing arrangement as recited in claim 5 wherein the packing rings are formed of polytetrafluoroethylene.

7. A packing arrangement as recited in claim 6 wherein the V-shaped rings converge toward an apex pointing toward the exterior of a structural body.

8. A packing arrangement as recited in claim 7 wherein a first portion of said plurality of packing rings converge toward an apex pointing the exterior of a structural body and a second portion of said plurality of packing rings converge toward an apex pointing away from the exterior of the structural body.

9. A method of sealing a shaft, comprising the steps of:
(a) forming a first substantially planar ring of memory retainable material with a forming die into a preformed V-shaped configuration having a pair of obliquely oriented converging sidewalls in concentric relationship to each other;
(b) positioning the V-shaped ring in an annular packing chamber of a structural body to interpose the ring between a shaft and sidewalls of the structural body such that the shaft and structural body sidewalls each compressingly engage the periphery of the ring and urge the converging sidewalls toward each other beyond the preformed configuration; and
(c) forming at least one additional ring of memory retainable material into the preformed V-shaped configuration with a forming die and positioning said at least one additional V-shaped ring into the annular packing chamber into aligned stacked relationship with the first V-shaped ring to form a packing assembly to seal between the shaft and the structural body.

10. A method as recited in claim 9 wherein the steps of positioning the first and at least one additional V-shaped rings into the annular packing chamber include stacking the rings in a loading cartridge and transferring the rings from the loading cartridge to the chamber.

11. A method as recited in claim 10 wherein the concentric sidewalls of the rings are compressingly urged toward each other beyond the preformed V-shaped configuration of the rings in the loading cartridge and the concentric sidewalls are retained compressed beyond the preformed V-shaped configuration during transfer from the loading cartridge to the packing chamber.

12. A method as recited in claim 11 wherein the loading cartridge has axially extending lips, and the axially extending lips are partially inserted into the packing chamber during transfer of the rings from the loading cartridge to the packing chamber.

13. A method as recited in claim 9 wherein the packing rings each have a thickness between 0.015 inch and 0.079 inches.

14. A method as recited in claim 13 wherein the memory retainable material is a fluoronated hydrocarbon polymer.

15. A method as recited in claim 14 wherein the memory retainable material is polytetrafluoroethylene.

16. A method as recited in claim 15 wherein the rings have a thickness of approximately 0.030 inch.

* * * * *